United States Patent [19]

Cook

[11] 4,392,759

[45] Jul. 12, 1983

[54] QUICK DISCONNECT MECHANISM FOR SHAFTS

[75] Inventor: Paul M. Cook, South Burlington, Vt.

[73] Assignee: General Electric Company, Burlington, Vt.

[21] Appl. No.: 232,459

[22] Filed: Feb. 9, 1981

[51] Int. Cl.³ .................... B25G 3/00; F16D 1/00; F16G 11/00

[52] U.S. Cl. .................... 403/11; 403/327; 403/314; 403/359; 403/317

[58] Field of Search ............ 403/328, 327, 325, 324, 403/DIG. 4, DIG. 7, 355, 359, 317, 316, 11

[56] References Cited

U.S. PATENT DOCUMENTS

| 2,673,750 | 3/1954 | Scheiwer | 285/277 |
|---|---|---|---|
| 2,821,277 | 1/1958 | Hughes | 403/359 X |
| 2,838,270 | 6/1958 | Danielson | 403/359 X |
| 3,070,390 | 12/1962 | Schröter et al. | 403/355 |
| 3,252,721 | 5/1966 | Weasler | 287/119 |
| 3,260,541 | 7/1966 | Sadler et al. | 287/53 |
| 3,396,554 | 8/1968 | Westercamp | 403/355 |
| 3,442,541 | 5/1969 | Metz | 287/119 |
| 3,926,532 | 12/1975 | Schlenker et al. | 403/322 |
| 3,945,744 | 3/1976 | Metz | 403/317 |
| 4,289,414 | 9/1981 | Reeker | 403/328 |

Primary Examiner—Wayne L. Shedd
Attorney, Agent, or Firm—Bailin L. Kuch

[57] ABSTRACT

A feature of this invention is the provision of a quick disconnect and connect mechanism for the transmission of torsional power between two concentric shafts including a collar, spring means which biases said collar to a first disposition whereat it holds at least one element in a position interlocking said two shafts, and cam means for converting torsional movement of said collar to axial movement of said collar against the bias of said spring means to translate said collar to a second disposition whereat said element is free to unlock said two shafts.

3 Claims, 5 Drawing Figures

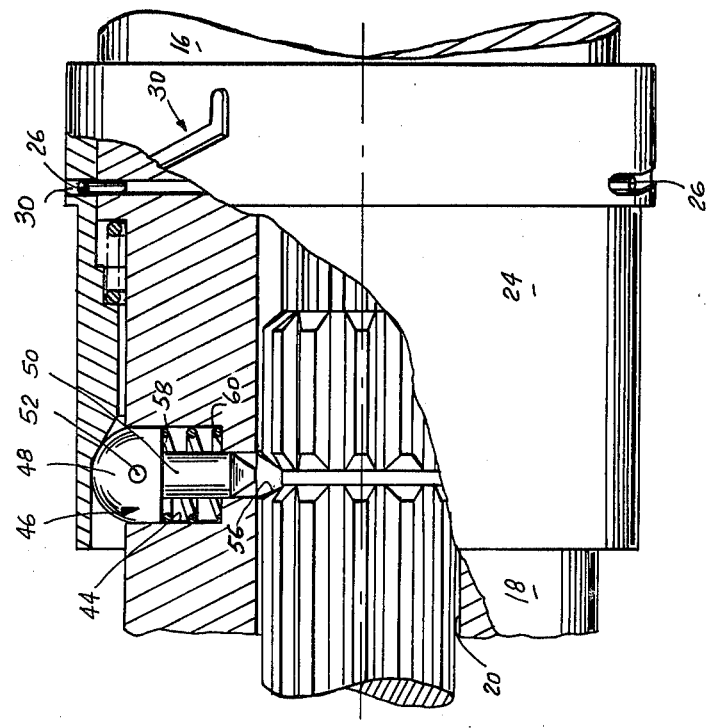
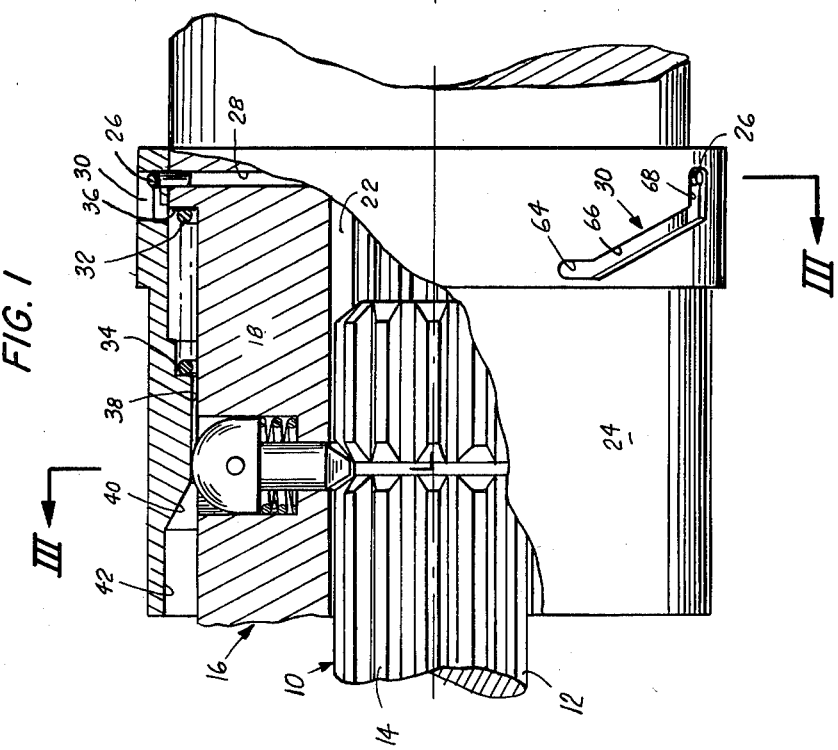

QUICK DISCONNECT MECHANISM FOR SHAFTS

The U.S. Government has rights in this invention pursuant to Contract No. F33657-75-C-0310 awarded by the Department of the Air Force.

BACKGROUND OF THE INVENTION

1. Field of the Invention

This invention relates to means for quickly releasing and quickly coupling concentric shafts for the transmission of torsional power therebetween.

2. Prior Art

The classical method of interconnecting two coaxial shafts is by means of a cross-pin fixed through mutually aligned diametrical bores in both shafts. More rapidly operable quick release couplers are shown by Weasler in U.S. Pat. Nos. 3,252,721, issued May 24, 1966; Sadler et al in 3,260,541, issued July 12, 1966; and Schlenker et al in 3,926,532, issued Dec. 16, 1975. These mechanisms use a collar which may be moved manually from a first disposition whereat it holds one or more dogs, pins or balls in a position interlocking one shaft with the other shaft, to a second disposition whereat the dogs, etc., are free to move to permit movement, axial and radial, between the shafts. The collar is spring biased into its first disposition and must be manually held in its second disposition against the bias of the spring. In a mechanism which may receive high axial shock loads during use, this spring bias is made very high. In cramped quarters, it may be very difficult to manipulate this collar.

It may be noted that mechanisms for coupling concentric rods or struts against mutual axial movement, but not against mutual torsional movement, are shown by Metz in U.S. Pat. Nos. 3,442,541, issued May 6, 1969, and in 3,945,744, issued Mar. 23, 1976. Metz shows a collar which is spring biased into its first disposition, but once moved manually against the strong bias of the spring to its second disposition may be locked therein.

SUMMARY OF THE INVENTION

An object of this invention is to provide a quick disconnect mechanism for concentric shafts which may be easily operated with one hand in cramped quarters.

A feature of this invention is the provision of a quick disconnect and connect mechanism for the transmission of torsional power between two concentric shafts including a collar, spring means which biases said collar to a first disposition whereat it holds at least one element in a position interlocking said two shafts, and cam means for converting torsional movement of said collar to axial movement of said collar against the bias of said spring means to translate said collar to a second disposition whereat said element is free to unlock said two shafts.

BRIEF DESCRIPTION OF DRAWING

These and other objects, features and advantages of the invention will be apparent from the following specification thereof taken in conjunction with the accompanying drawing in which:

FIG. 1 is a side view of the preferred embodiment of this invention, shown in the interlocked disposition;

FIG. 2 is a side view of the embodiment of FIG. 1, shown in the unlocked disposition;

DESCRIPTION OF THE INVENTION

Figure 4:
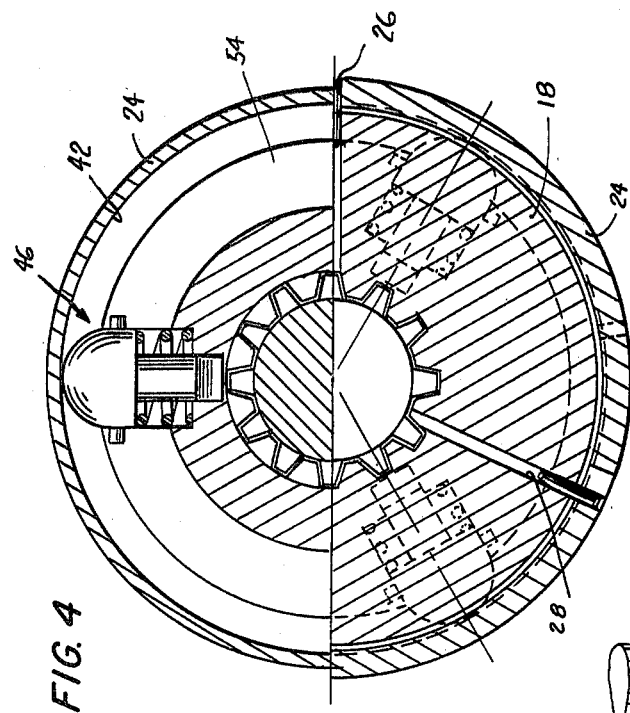
FIG. 4 is a transverse view in cross-section of the embodiment of FIG. 1, also taken along the plane III—III, shown in the unlocked disposition.
Figure 3:
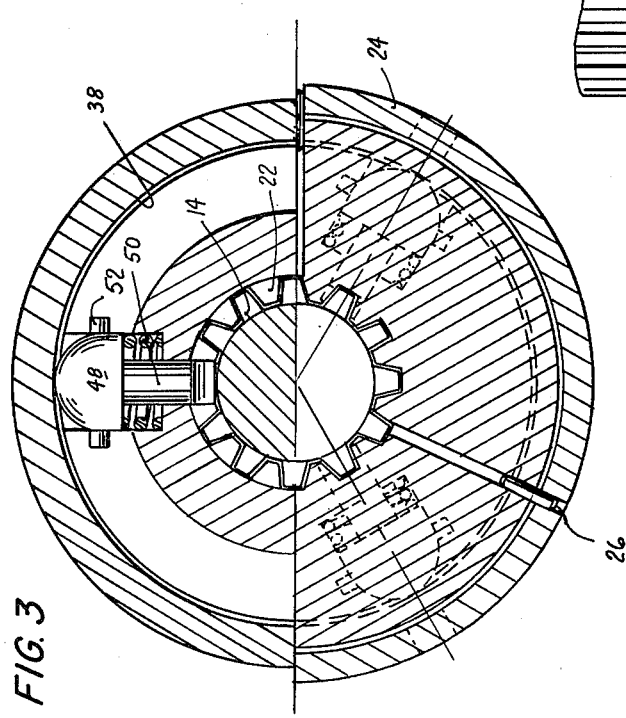
FIG. 3 is a transverse view in cross-section of the embodiment of FIG. 1, taken along the plane III—III, shown in the interlocked disposition.
Figure 5:
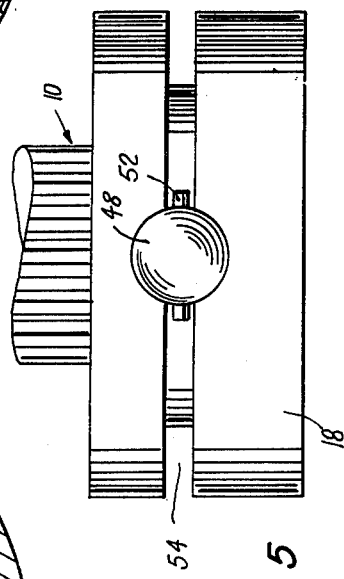
FIG. 5 is a detail top view of a portion of the embodiment of FIG. 1, with the collar removed.

A first shaft 10 has an end portion 12 having a plurality of longitudinally extending spline cutouts 14 cut into its peripheral surface. A second shaft 16 has a hub end portion 18 with a longitudinally extending bore 20 which is coaxial with the shaft 10 and has a mating plurality of longitudinally extending splines 22.

An annular collar 24 is disposed on the portion 18 and captured thereto by a pin 26 which is fixed in a radial bore 28 in the portion 18 and extends into a longitudinally extending slot 30 in the sleeve. As seen in FIG. 1, the sleeve is biased toward its leftmost disposition by a helical compression spring 32 which is captured between a shoulder 34 on the collar and a shoulder 36 on the portion 18. The collar has a longitudinal bore portion 38 of smallest diameter, a ramp portion 40, and a bore portion 42 of largest diameter.

The portion 18 has three radially extending bores 44. A respective lock pin 46 is disposed in each bore 44. Each pin 46 has a button head 48, a post 50, and a transverse guide pin 52. The pin 52 is fixed through the head 48 and its projecting ends ride in an annular slot 54 in the portion 18. The distal end of the post 50 is of truncated V-shape and adapted to fit in a U-shaped annular slot 56 in first shaft end portion 12 and which slot 56 intersects the spline cutouts 14. A respective helical compression spring 58 is captured between the underside of the head 48 and a shoulder 60 in the bore 44, and biases the lock pin 46 centrifugally.

When the collar is in its rightmost disposition, as seen in FIG. 2, the springs 58 bias their respective lock pins 46 centrifugally, the distal ends of the posts are withdrawn from the annular slot 56, and the shaft 14 may be withdrawn from the bore 20 of the shaft portion 18.

When the collar is moved from its rightmost disposition to its leftmost disposition under the bias of the spring 32, the ramp portion 40 overrides the heads of the lock pins 46 and cams them centripetally to insert the distal ends of the posts into the annular slot 56, precluding the withdrawal or other axial movement of the shaft 14 from the bore 20 of the shaft portion 18. The interlocking splines 14 and 22 preclude torsional movement of the shaft 14 with respect to the shaft portion 18.

The pin 26 is fixed in a radial bore in the shaft portion 18, to the right of the right end of the helical spring 32, and has a portion extending centrifugally into a slot 30 in the collar. The slot includes a leftmost transverse portion 64, a diagonal intermediate portion 66, and a rightmost longitudinal portion 68.

The portion 68 permits the spring 32 to exert its full force to hold the collar in its leftmost disposition and to accommodate any high axial shock loads to the shafts without loss of interlock. The diagonal portion 66 provides a mechanical advantage to permit a relatively low manual force applied in torsion to overcome the relatively high spring force applied longitudinally. The transverse portion 64 locks the collar against the bias of the spring in the collar's rightmost disposition. Thus the collar may be operated with but a single hand in cramped quarters. In the embodiment shown, a 90° turn of the collar serves to unlock the shafts.

What is claimed is:

1. A quick disconnect mechanism for the transmission of torsional power between two concentric shafts, comprising:
    a first shaft having a first longitudinal axis;
    a second shaft in operable engagement with said first shaft and having a second longitudinal axis which is coaxial with said first longitudinal axis;
    collar means interengaged with and carried by said second shaft and having relative longitudinal and torsional displacement with respect thereto;
    first spring means interengaged with and carried by said collar means and said second shaft which biases said collar means to a first longitudinal disposition with respect to said second shaft;
    said collar means and said second shaft having first cam and cam follower means in mutual engagement for converting torsional movement of said collar means with respect to said second shaft to longitudinal movement of said collar means with respect to said second shaft against the bias of said first spring means and thus translate said collar means to a second longitudinal disposition with respect to said second shaft.

2. A mechanism according to claim 1 further including:
    detent means interengaged with and carried by said second shaft and having
    a first disposition whereat said detent means interlocks said first and second shafts against relative longitudinal movement, and
    a second disposition whereat said detent means permits relative longitudinal movement between said first and second shafts,
    second spring means which biases said detent means from said first disposition to said second disposition, and
    said collar means includes second cam means operatively engaged with said detent means when said collar means is in its said first disposition which drives said detent means to its said first disposition.

3. A mechanism according to claim 2 wherein:
    said first cam and cam follower means includes
    a pin extending transversely from said second shaft, and
    a slot in said collar means receiving said pin.

* * * * *